No. 741,472. PATENTED OCT. 13, 1903.
D. FARQUHAR & A. W. AITKEN.
STOKER FOR THRESHING OR OTHER ENGINES.
APPLICATION FILED NOV. 17, 1902.
NO MODEL. 2 SHEETS—SHEET 1.

WITNESSES:

INVENTORS
D. Farquhar
A. W. Aitken
BY
Attorney

No. 741,472. PATENTED OCT. 13, 1903.
D. FARQUHAR & A. W. AITKEN.
STOKER FOR THRESHING OR OTHER ENGINES.
APPLICATION FILED NOV. 17, 1902.
NO MODEL. 2 SHEETS—SHEET 2.

WITNESSES:

INVENTORS
D. Farquhar
A. W. Aitken
BY
Attorney

No. 741,472. Patented October 13, 1903.

UNITED STATES PATENT OFFICE.

DAVID FARQUHAR AND ANDREW W. AITKEN, OF BUFFALO, NEW YORK, ASSIGNORS TO BUFFALO PITTS COMPANY, A CORPORATION OF NEW YORK.

STOKER FOR THRESHING OR OTHER ENGINES.

SPECIFICATION forming part of Letters Patent No. 741,472, dated October 13, 1903.

Application filed November 17, 1902. Serial No. 131,764. (No model.)

*To all whom it may concern:*

Be it known that we, DAVID FARQUHAR and ANDREW W. AITKEN, of Buffalo, in the county of Erie and State of New York, have invented certain new and useful Improvements in Stokers for Threshing or other Engines; and we do hereby declare the following to be a full, clear, and exact description of the invention, such as will enable others skilled in the art to which it appertains to make and use the same.

The primary object of this invention is to so mount the engine or motor and all the operative parts of a stoker that they may be moved in unison with a stoker-casing hinged to one side of a furnace-door opening.

Other objects are to apply the driving power of the feeder to the lower forward or delivery end thereof, so that the feeder-apron will have a direct pulling action, thereby avoiding all danger of buckling, as when driven at the upper rearward end; to so construct the feeder that it will not only allow for any crowding or overfeeding, but will also serve to automatically pack the straw against the conveyer and insure its travel toward the furnace; to insure engagement of the feeder with the straw; to so mount the feeder that it will have a rocking action with its axis concentric with the driving-shaft and at the same time relieve the latter of all friction caused by the weight of the feeder and the pressure of the straw, thus reducing the power requisite to drive the feeder; to enable the stoker to be readily and easily operated by hand, as in starting, without the necessity of moving the feeder out of the way; to provide simple and highly-efficient means for operating the feeder and conveyer, and to insure the return to the straw-pile at the receiving end of the stoker of any chaff or short straw that may be separated in the forward travel of the conveyer.

The invention will be hereinafter fully set forth, and particularly pointed out in the claims.

Figure 1:
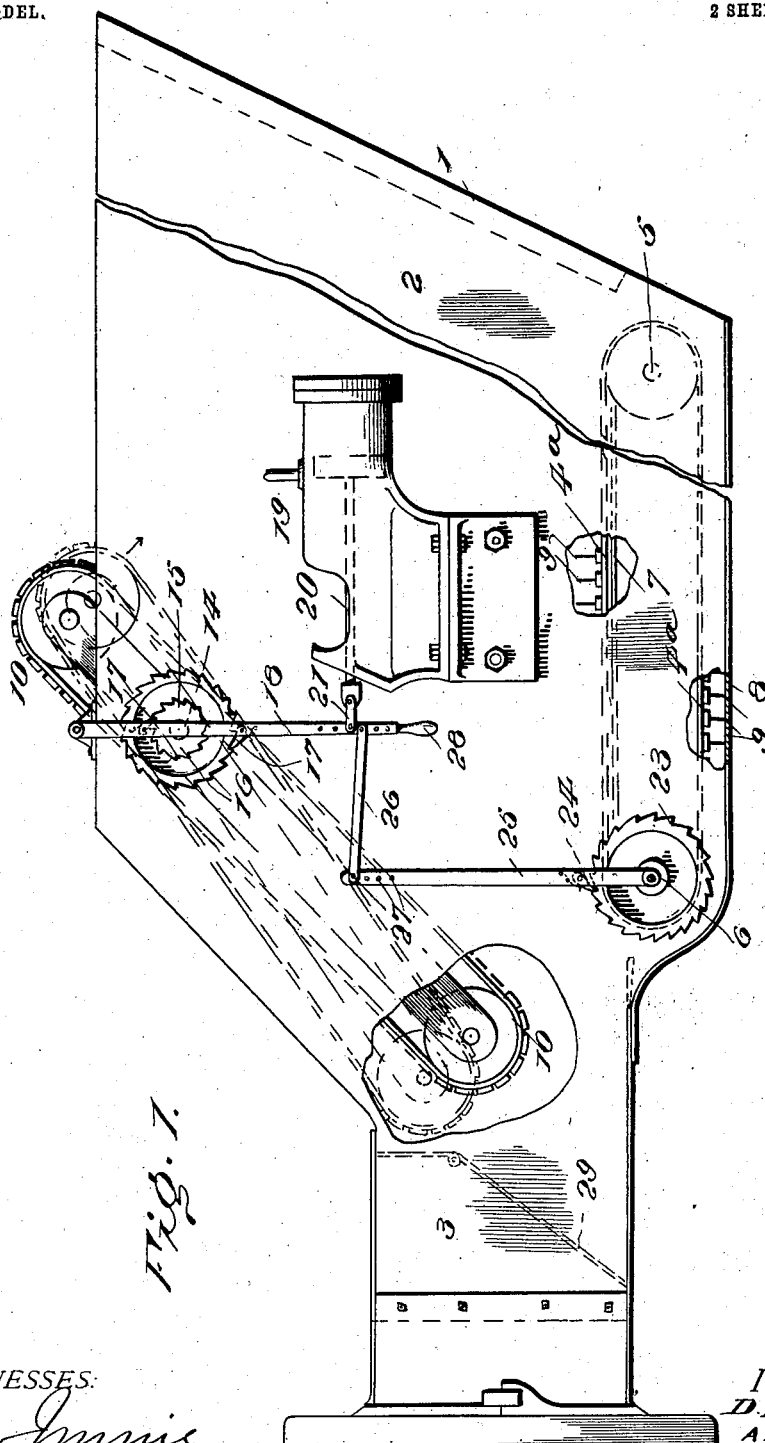
Figure 2:
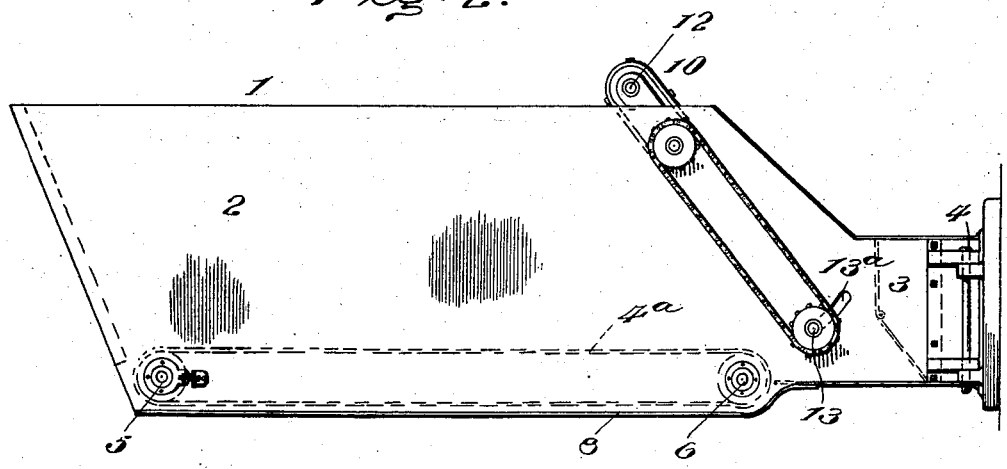
Figure 3:
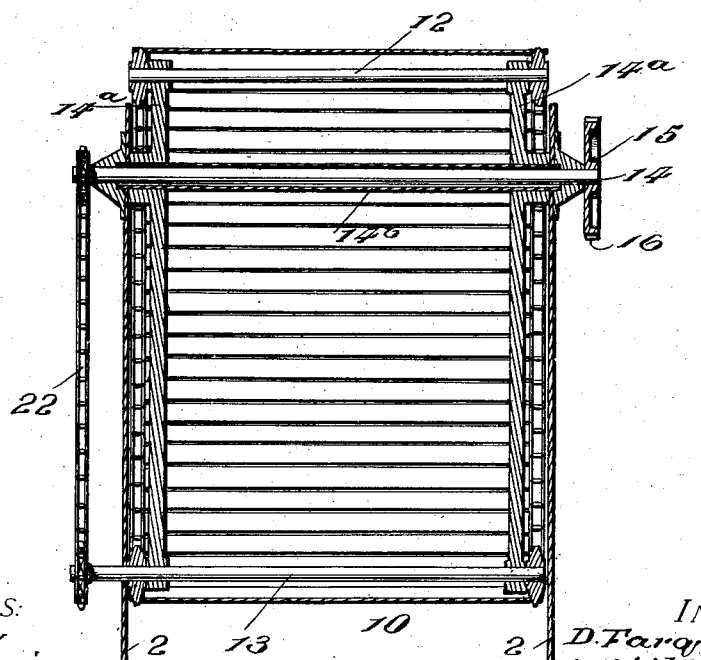

In the accompanying drawings, Figure 1 is a side elevation with parts broken away, showing the improved stoker secured to the fuel-opening of a furnace. Fig. 2 is a view similar to Fig. 1, but on a smaller scale and from the opposite side. Fig. 3 is a plan view with parts omitted.

Referring to the drawings, 1 designates the casing, having the ordinary side uprights 2 and a throat 3, which latter is hinged at 4 to one side of the furnace-opening or fuel-door. The straw placed in the casing is carried forward by a slow-moving endless conveyer $4^a$, whose belts are passed over wheels on shafts 5 and 6. The upper flight of the conveyer travels over a table 7, and the lower flight returns beneath such table and over the bottom 8 of the casing. Any chaff or short straw separated in the forward travel of the conveyer is brought back by the lower or return flight, forcing the same over the floor 8 to the receiving end of the casing. From the cross-bars of the conveyer $4^a$ extend pins or teeth 9, the function whereof is to retard long or tangled straw and prevent the same being fed in bunches to the furnace.

10 is the feeder, whose endless chains engage sprocket-wheels on shafts 12 and 13, mounted, respectively, in the upper and lower ends of the feeder-frame, the shaft 13 being extended through a curved slot $13^a$ in the casing-upright. This frame is capable of rocking, its axis being concentric with the driving-shaft 14, extended transversely of the frame intermediate the ends thereof. The sides $14^a$ of the frame have their bearings directly upon a tubular spindle $14^b$, inclosing shaft 14 and mounted at its ends in the sides of the casing independently of the shaft, the ends of the latter having their bearings in such sides beyond the ends of the spindle. Thus the weight of the feeder is not on the shaft, although mounted concentrically therewith. On one of the protruding ends of the driving-shaft 14 is a wheel having inner and outer series of circularly-arranged ratchet-teeth 15 and 16, with which are designed to engage pawls 17, carried by a lever 18, fulcrumed at its upper end on a stud extending from one of the uprights 2. The reciprocation of this lever effects a continuous rotation of shaft 14, the pawls 17 alternately positively engaging the two sets of ratchets.

19 designates an engine or other motor mounted on the outside of one of the uprights 2, steam being supplied thereto preferably from the threshing-engine, or it may be from any other suitable source. The piston-rod 20 of this engine is connected by a link 21 to the lever 18, the latter having a series of holes therein, so that the link may be connected at different points, according to the speed to be imparted to the driving-shaft. The motion of shaft 14 is communicated through a sprocket-chain 22 to the shaft 13, which shaft is at the lower forward or delivery end of the feeder. Hence the feeder is positively driven at the delivery end, and all danger of buckling, as when the power is applied to the upper rear shaft, is avoided.

By axially mounting the feeder-frame the inner end thereof is free to rise and fall to accommodate itself to the condition of the straw thereunder, and when raised thereby its upper rearward end is forced downwardly, thereby engaging and tending to pack the straw down against the conveyer. The engagement of the straw with this upper rearward end of the feeder has a tendency to keep the lower forward end thereof tight down against the straw, relieving undue strain on the springs.

On the forward shaft 6 of the conveyer 4$^a$ is a ratchet-wheel 23, with which engages a pawl 24 of a lever 25, which lever is fulcrumed on such shaft and connected to lever 18 by link 26. In the lever 25 is a series of holes 27 to permit link 26 to be secured at different points to regulate the speed of travel of the conveyer. Ordinarily the latter travels at about one-third of the speed of the feeder. This being so, the feeder would tend to draw long or tangled straw from the conveyer in large bunches but for the fact that the same is retarded by the teeth 9.

It will be seen that when the engine 19 is operated the lever 18 will be constantly reciprocated, thereby effecting the constant rotation of shaft 14, from which motion is transmitted to the lower forward end of the feeder, and this reciprocation of the lever 18 is communicated through link 26 to lever 25, so that the conveyer will be operated simultaneously with the feeder, but at a slower rate of speed.

If the engine be dependent upon a threshing-engine for its steam-supply, it is necessary in starting to provide for feeding straw to the furnace by hand-power. This we are enabled to do without having to move the feeder out of the way by the operator grasping the lower free end of lever 18 and reciprocating the same back and forth by hand. For this purpose such end of the lever 18 is provided with a handle 28. The straw as it is fed through the throat passes an ordinary single-leaf door 29.

The advantages of our invention are apparent to those skilled in the art. It will be especially observed that by mounting the engine or other motor directly on the stoker-casing all of the operative parts of the stoker are carried by such casing and also that by axially mounting the feeder the latter will automatically adjust itself to the condition of the straw passing the throat and will also tend to pack the straw down against the conveyer. This compensatory action keeps the delivery end of the feeder down to the straw. A stoker constructed in accordance with our invention is extremely simple and highly efficient in operation.

We claim as our invention—

1. A stoker for threshing and other engines having a casing, a conveyer therein, a feeder pivotally supported at points intermediate its length so as to be free to rise and fall at its ends, and means for actuating such feeder and conveyer, as set forth.

2. In a stoker for threshing and other engines, a casing, a conveyer therein, a driving-shaft, a feeder having its frame pivotally mounted concentrically with but independently of such driving-shaft, such shaft being intermediate the ends of the feeder, and means for actuating such shaft, as set forth.

3. The combination with the casing and the driving-shaft, of the feeder-frame pivotally mounted concentrically with but independently of such shaft at points intermediate its ends, shafts at the ends of such frame, endless aprons carried by such shafts, a wheel on one of said shafts, a belt driven by said driving-shaft and engaging said wheel, and means for actuating the driving-shaft, substantially as set forth.

4. The combination with the casing and the driving-shaft, of the tubular spindle inclosing said shaft mounted in the sides of the casing independently of the shaft, the rocking feeder axially mounted intermediate its ends on such spindle, and means actuated by said driving-shaft for operating the feeder, as set forth.

5. The combination with the casing and the driving-shaft, of the tubular spindle inclosing said shaft mounted in the sides of the casing independently of the shaft, the rocking feeder axially mounted intermediate its ends on such spindle, and means actuated by said driving-shaft for applying power to said feeder at the forward or delivery end thereof, substantially as set forth.

6. A stoker for threshing and other engines having a rocking feeder, and means applied to the lower forward, or delivery end, of such feeder for driving the latter, as set forth.

7. A stoker for threshing and other engines having a rocking feeder axially mounted at a point intermediate its length, a driving-shaft, means connecting such shaft to the lower forward, or delivery end, of such feeder, and means for actuating such shaft, substantially as set forth.

8. The combination with the casing, of the conveyer therein, a rocking feeder axially mounted at a point intermediate its length, a driving-shaft, means connecting such shaft to the lower forward, or delivery end, of such feeder, an engine mounted on the casing, and means operated by the engine for actuating said driving-shaft and the conveyer, as set forth.

9. The combination with the casing, of the conveyer therein, a rocking feeder axially mounted at a point intermediate its length, a driving-shaft carrying two sets of ratchet-teeth, a lever carrying two pawls engaging said ratchet-teeth, means connecting such shaft to the lower forward, or delivery end, of such feeder, an engine mounted on the casing, and means connecting such engine to said lever and also to the conveyer, as set forth.

10. The combination with the casing having an endless conveyer, shafts therefor, and a ratchet-wheel on one of said shafts, of a lever fulcrumed on such latter shaft carrying a pawl engaging said ratchet-wheel, a feeder pivotally mounted in said casing, a driving-shaft for said feeder, two sets of ratchet-teeth carried by said driving-shaft, a lever carrying two pawls engaging said ratchet-teeth, and means for synchronously operating both of the levers, substantially as set forth.

11. The combination with the casing having an endless conveyer, shafts therefor, and a ratchet-wheel on one of said shafts, of a lever fulcrumed on such latter shaft carrying a pawl engaging said ratchet-wheel, a feeder pivotally mounted in said casing, a driving-shaft for said feeder, two sets of ratchet-teeth carried by said driving shaft, a lever carrying two pawls engaging said ratchet-teeth, an engine mounted on said casing connected to one of said levers, and a link connecting the two levers, as set forth.

12. The combination with the casing, of a driving-shaft mounted therein, the feeder having upper and lower shafts, a wheel on the lower shaft, a belt driven by said driving-shaft engaging said wheel of the lower shaft, two sets of ratchet-teeth fast on said driving-shaft, a lever fulcrumed on said casing and carrying two pawls engaging said ratchet-teeth, and means for reciprocating said lever, substantially as set forth.

13. The combination with the casing having a table therein above its bottom, of an endless conveyer the upper flight of which is movable over such table, and the lower or return flight movable over the bottom of the casing, chaff and short straw separated by the forward flight being carried by the return-flight to the receiving end of the casing, as set forth.

In testimony whereof we have signed this specification in the presence of two subscribing witnesses.

DAVID FARQUHAR.
ANDREW W. AITKEN.

Witnesses:
MOSQUIS J. TODD,
H. P. SEIPP.